Figure 1:
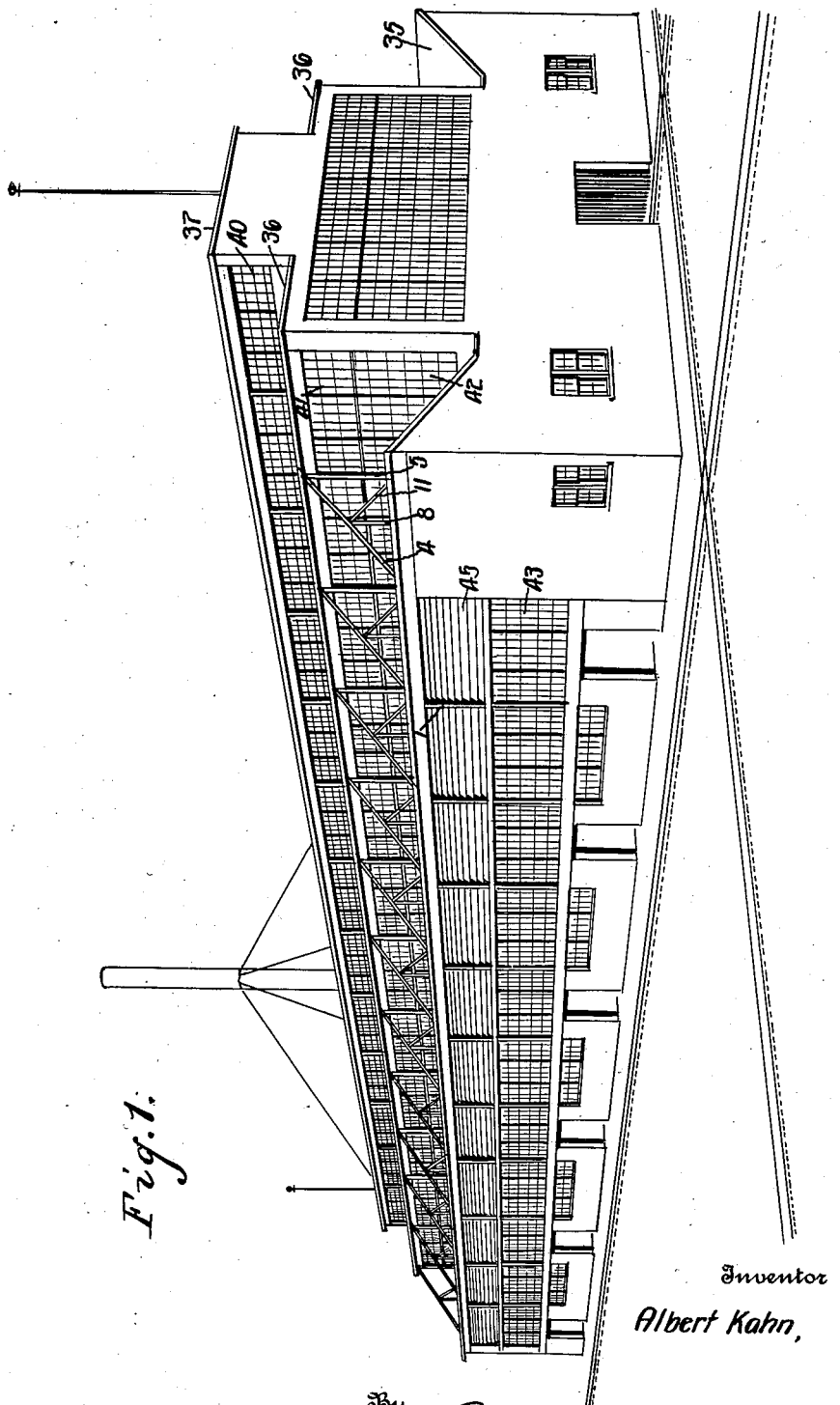

A. KAHN.
BUILDING.
APPLICATION FILED FEB. 24, 1919.

1,319,090.

Patented Oct. 21, 1919.
2 SHEETS—SHEET 1.

Inventor
Albert Kahn,
By Pogelein & Spencer
Attorneys

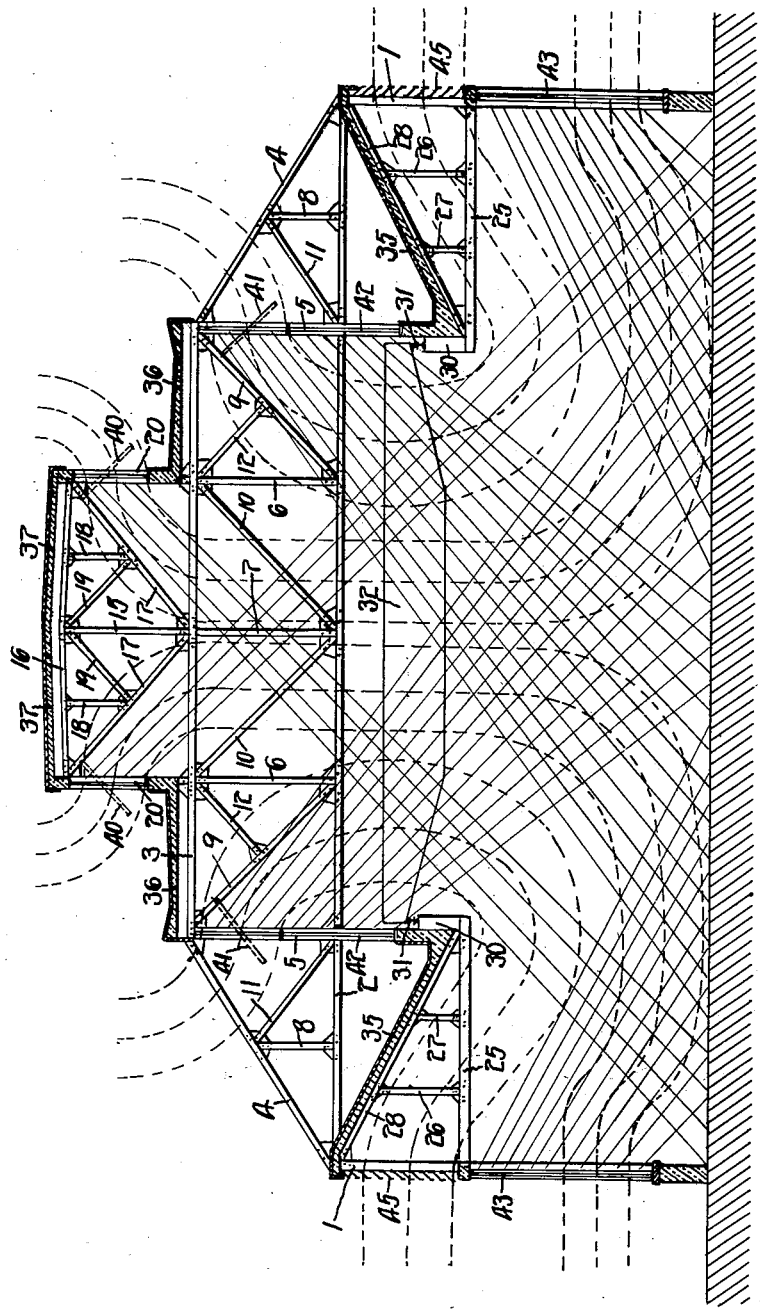

UNITED STATES PATENT OFFICE.

ALBERT KAHN, OF DETROIT, MICHIGAN, ASSIGNOR TO TRUSCON STEEL COMPANY, OF YOUNGSTOWN, OHIO, A CORPORATION OF MICHIGAN.

BUILDING.

1,319,090.      Specification of Letters Patent.      Patented Oct. 21, 1919.

Application filed February 24, 1919. Serial No. 278,585.

*To all whom it may concern:*

Be it known that I, ALBERT KAHN, a citizen of the United States, and residing at Detroit, in the county of Wayne and State of Michigan, have invented a new and Improved Building, of which the following is a specification.

The present invention relates to buildings, its purpose being to provide, more efficiently than has been possible heretofore in structures of the same general class, for ventilation and light. In buildings constructed in accordance therewith, the light is drawn from the exterior and distributer effectively over substantially every portion of the floor space and gases, for example, those generated on casting beds or in forges, are quickly gotten rid of without pocketing under the roof.

These advantages are secured by an arrangement of the wall and roof sections in such manner as to provide for a considerable increase in side exposure, that is, in light and ventilating area, over the usual practice, and by so positioning said area as to more effectively secure both the desired distribution of light and the establishment of ventilating currents.

The invention also provides a highly desirable arrangement of crane tracks without the necessity for the placing of supporting columns or posts within the space between the side walls, thus affording a free and unobstructed floor space throughout the building from side to side and from end to end.

In the accomplishment of these general purposes, the invention consists in a building one section of the roof of which is inclined downwardly and inwardly from the side of the building and suspended along its lower edge from an overhead transverse truss, whereby increased window area is afforded between said section and an adjacent section offset both laterally and vertically therefrom.

Again, the invention consists in a building the roof of which is formed in a plurality of sections offset laterally and vertically from one another and supported mainly by roof trusses which extend across the building from side to side, the outer sections being positioned below the trusses and being inclined downwardly and inwardly from the corresponding side wall and joined to the next higher sections of the roof by glazed ventilating panels or tiers of windows.

The invention further consists in a building of the nature stated wherein longitudinal crane ways or tracks are suspended from the main trusses substantially along the inner edges of the lower roof sections.

The invention further consists in a building of this type wherein the end portions of the main trusses are exterior to the inclosed area, and wherein the end posts thereof are preferably inclined to substantially directly connect the outer edges of the two adjacent roof sections, thus affording pleasing and economical lines of design.

Other features of the invention will be best understood from the following description and from the claims, wherein they are specifically pointed out.

In the drawings, Figure 1 is a perspective view showing a preferred embodiment of the invention. Fig. 2 is a transverse section corresponding to Fig. 1, the course of the primary light rays and the path of the main ventilating air currents also being shown.

Considering first the framework of the building, it will be observed that the outer side walls include posts or columns 1 that extend up to the line of desired clearance, and that supported thereon and extending across the building from side to side is a main roof truss which, in the present instance, includes the lower chord 2, the upper chord 3, inclined end posts 4, verticals 5—6—7, sub-verticals 8, diagonals 9—10, and sub-diagonals 11—12. Trusses, other than the Pratt type, might be used, but the construction shown is structurally efficient and presents but few members transversely to the main lines of light travel or illumination, that is, it casts but little shadow inasmuch as the main diagonals are substantially parallel to the light-beams. Mounted upon the main truss is a secondary roof truss of less span which, in this instance, includes the center vertical 15, upper chord 16, diagonals 17, sub-verticals 18, sub-diagonals 19 and end posts 20. As before, other types of sub-trusses may be used but this particular type interferes very little with the light and possesses structural advantages. The verticals 5 are continued downwardly a considerable distance below the chord 2 and at their lower ends support the inner ends of supplementary or sub roof trusses that, as shown, include the lower chords 25, the uprights 26—27, the upwardly and outwardly inclined diagonals 28, and have their end posts formed by the posts 1. Adjacent trusses, main, secondary and supplementary, are connected by suitable sway bracing, not shown.

The particular building shown is intended for shop purposes, such as a forge shop or foundry, and the extreme inner ends of the supplementary trusses are joined by girders 30 carrying tracks 31 upon which a crane 32 may travel; however, the invention is obviously applicable to building constructions wherein the girders and tracks are omitted and wherein questions of light and ventilation, as in train sheds, or in some cases those of light primarily, as in exposition buildings, are involved.

This arrangement of trusses permits the formation of the roof on each side of the longitudinal central plane of the building in two or more steps or sections, the first of which—35—conforms to the upper chords 28 and slopes inwardly, whereas the second and third—36 and 37—are either substantially flat, as shown, or also slope inwardly. The vertical side face of the building, that is, the area available for lighting and ventilating, is therefore materially greater than that of a vertical wall of the height of the building, and it is evident that by providing the tiers of windows 40—41—42—43 the primary light is efficiently disseminated over substantially the entire floor area as indicated by the ray lines in Fig. 2. While the space between the upper ends of the posts 1 and the outer ends of the chords 25 might also be glazed, it is preferred to provide therein the louvers 45. It will be understood that any desired number or all of the windows 40—41 are arranged to be opened and shut, being preferably of the type which are swingable about a horizontal axis mid-way of their height, and that such other or all of the glazed bays or sections 42—43 as may be deemed advisable in the particular construction are also adapted to be conveniently opened. Therefore the normal course of the ventilating currents is about as indicated by the dashed lines: in any event, all pockets for smoke or gas are avoided and the air within the building is constantly and properly renewed.

It will be observed that the inclosing elements of the roof structure in cross-section somewhat resemble a stair, the part 35—36—37 corresponding to the tread sections and the glazed panels or areas to the risers; and that the building may be compared, in ventilating function, with a tapering stack.

I claim:

1. In a building, main trusses extending across the building from side to side, means to support the trusses, a roof structure formed of a plurality of sections offset laterally and vertically from one another, sub-trusses projecting inwardly from the main trusses below the latter and having their inner ends suspended therefrom, and crane-supporting rails carried by the sub-trusses sufficiently below the main trusses to permit the passage of traveling cranes.

2. A building comprising side walls including posts, a main truss extending across the building from side to side and supported by the posts, a roof structure formed of a plurality of sections offset laterally and vertically from one another, said roof structure including at each side a downwardly and inwardly inclined section having its inner edge below the truss and suspended therefrom, and lighting and ventilating means interposed between the inner edges of said inclined sections and the outer edges of the sections next above.

3. A building comprising a side wall including a post, a main roof truss extending transversely of the building and having one end carried by the post, a sub-truss projecting inwardly from the main truss below the latter and having its inner end suspended therefrom, and an inwardly inclined roof section carried by the sub-truss.

4. A building comprising side walls glazed for the most part and adapted to permit the passage of ventilating currents of air, main roof trusses extending across between said side wall and having their lower chords positioned at least substantially as high as the tops of the side wall, roof sections inclined downwardly and inwardly from the upper edges of the corresponding side wall, other roof sections carried by the trusses and disposed higher than and inwardly from the first mentioned sections, the outer edges of the last-named sections being joined to the inner edges of the corresponding first-named sections by glazed panels in which the glazing extends below the lower chords of the truss.

5. A building comprising side walls and a roof structure including main roof trusses extending across from side to side between said walls, each longitudinal half of said roof structure being formed in elements corresponding to the treads and an interposed riser of a stair, the riser elements being glazed and adapted to permit the passage of natural currents of air for ventilating purposes, said main trusses including inclined end struts forming substantially direct connections between the outer edges of the roof sections which correspond to the stair treads.

6. A building comprising side walls and a roof formed in steps or sections offset vertically and laterally from one another on each side of the building, main roof trusses extending across between the tops of the side walls, sub-roof trusses forming supports for the lowermost roof sections and suspended, at their inner ends, from the main roof trusses, and crane tracks extending longitudinally of the building along the inner edges of said lowermost roof sections and braced against lateral movement by said sub-roof trusses.

7. A building comprising side wall posts, roof trusses extending across between the tops of said posts, said trusses including inclined end posts, a roof covering formed in sections offset vertically and laterally from each other, the outer roof sections being connected to the next inner sections by glazed panels extending susbtantially across the truss from its top to below the plane of the top of the outer walls from substantially the upper ends of the inclined end posts.

8. A building comprising side wall posts, main roof trusses extending across between the upper ends of the posts and including upper chords and lower chords, a roof covering formed in sections offset laterally and vertically from each other, relatively upper sections being approximately in the plane of the upper chords of said trusses and relatively lower sections extending inwardly below said trusses from the upper ends of the posts and having their inner edges supported by the main trusses, glazing interposed between the inner edges of said lower sections and the outer edges of said upper sections, said trusses including main diagonals extending downwardly and inwardly from the outer edges of said upper sections to the lower chord of the corresponding truss, whereby the obstruction offered to light passing down to the floor surface of the building is minimized, and sub-trusses projecting inwardly from said posts and below the main trusses and having their inner ends suspended from the main trusses and supporting the relatively lower sections of said roof.

ALBERT KAHN.